(12) United States Patent
Tu

(10) Patent No.: US 8,042,848 B2
(45) Date of Patent: Oct. 25, 2011

(54) TELESCOPIC CLIPPING APPARATUS

(76) Inventor: Jin-Tong Tu, Chiayi (TW)

( * ) Notice: Subject to any disclaimer, the term of this patent is extended or adjusted under 35 U.S.C. 154(b) by 0 days.

(21) Appl. No.: 12/692,046

(22) Filed: Jan. 22, 2010

(65) Prior Publication Data

US 2010/0201142 A1  Aug. 12, 2010

(30) Foreign Application Priority Data

Feb. 12, 2009  (TW) .............................. 98104409 A

(51) Int. Cl.
*B25J 1/00* (2006.01)
*B25J 1/04* (2006.01)
*A47F 13/06* (2006.01)

(52) U.S. Cl. ...................................... 294/19.1

(58) Field of Classification Search ............. 294/19.1, 294/24, 103.1; 56/333; 81/53.12; 7/161
See application file for complete search history.

(56) References Cited

U.S. PATENT DOCUMENTS

| | | | | |
|---|---|---|---|---|
| 4,854,626 A | * | 8/1989 | Duke | 294/19.1 |
| 5,730,033 A | * | 3/1998 | Mitrowski | 81/53.11 |
| 5,901,994 A | * | 5/1999 | Riddle et al. | 294/19.1 |
| 6,085,681 A | * | 7/2000 | Morton | 114/221 R |

* cited by examiner

*Primary Examiner* — Paul T Chin

(57) ABSTRACT

A telescopic clipping apparatus includes a handle, a lever, a telescopic unit, a clipping unit, a reel, a pulley and a cable. The lever is movably connected to the handle. The telescopic unit is connected to the handle. The clipping unit is pivotally connected to the telescopic unit. A reel is located in the telescopic unit. A pulley is connected to the clipping unit. The cable is wound around the pulley, and includes a first end tied to the lever and a second end tied to the reel.

13 Claims, 7 Drawing Sheets

TELESCOPIC CLIPPING APPARATUS

BACKGROUND OF INVENTION

1. Field of Invention

The present invention relates to a pair of pincers and, more particularly, to a telescopic clipping apparatus.

2. Related Prior Art

A senior citizen, a patient or a disabled person may use a pair of pincers to take hold of a thing instead of moving near the thing and taking the thing with a hand. Referring to FIG. 1, a conventional pair of pincers includes a tube 10, a handle 11, a lever 12, a rod 13, two jaws 15, two connecting elements 16 and two skid-proof sleeves 17. The handle 11 is secured to the tube 10. The lever 12 is movably connected to the handle 11. The jaws 15 are pivotally connected to two extensive portions from an end of the tube 10. Each of the skid-proof sleeves 17 is provided around a related one of the jaws 15. Each of the connecting elements 16 is connected to a related one of the jaws 15. The rod 13 is inserted through the tube 10. An end of the rod 13 is pivotally connected to the connecting elements 16. Another end of the rod 13 is secured to the lever 12. Thus, by pulling the lever 12, a user can close the jaws 15. There are however problems with this conventional pair of pincers. Firstly, the pair of pincers might be too short to reach a thing that is far from the user. In other cases, the pair of pincers might be too long to clip a thing that is too far to reach with a bare hand but not very far away. Secondly, a user who has troubles in twisting his or her hands might have trouble in clipping a thing laid horizontally or vertically since the movement of the handle 11 and the pivotal of the jaws 17 are in a same plane.

The present invention is therefore intended to obviate or at least alleviate the problems encountered in prior art.

SUMMARY OF INVENTION

It is the primary objective of the present invention to provide a telescopic clipping apparatus.

To achieve the foregoing objective, the telescopic clipping apparatus includes a handle, a lever, a telescopic unit, a clipping unit, a reel, a pulley and a cable. The lever is movably connected to the handle. The telescopic unit is connected to the handle. The clipping unit is pivotally connected to the telescopic unit. A reel is located in the telescopic unit. A pulley is connected to the clipping unit. The cable is wound around the pulley, and includes a first end tied to the lever and a second end tied to the reel.

Other objectives, advantages and features of the present invention will become apparent from the following description referring to the attached drawings.

BRIEF DESCRIPTION OF DRAWINGS

The present invention will be described via detailed illustration of the preferred embodiment versus the prior art referring to the drawings.

DETAILED DESCRIPTION OF PREFERRED EMBODIMENT

Figure 1:
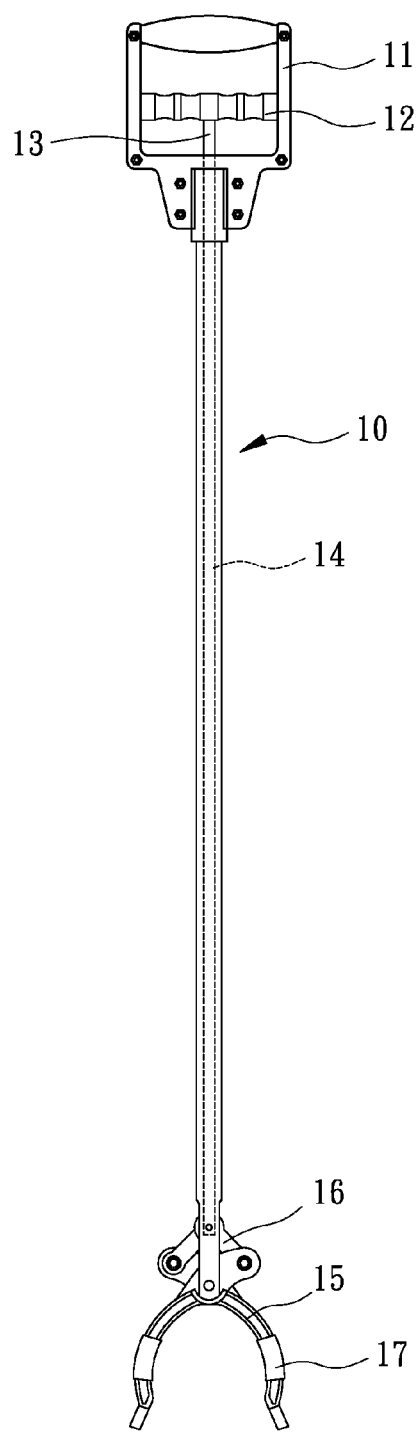
FIG. 1 is a front view of a conventional pair of pincers.
Figure 2:
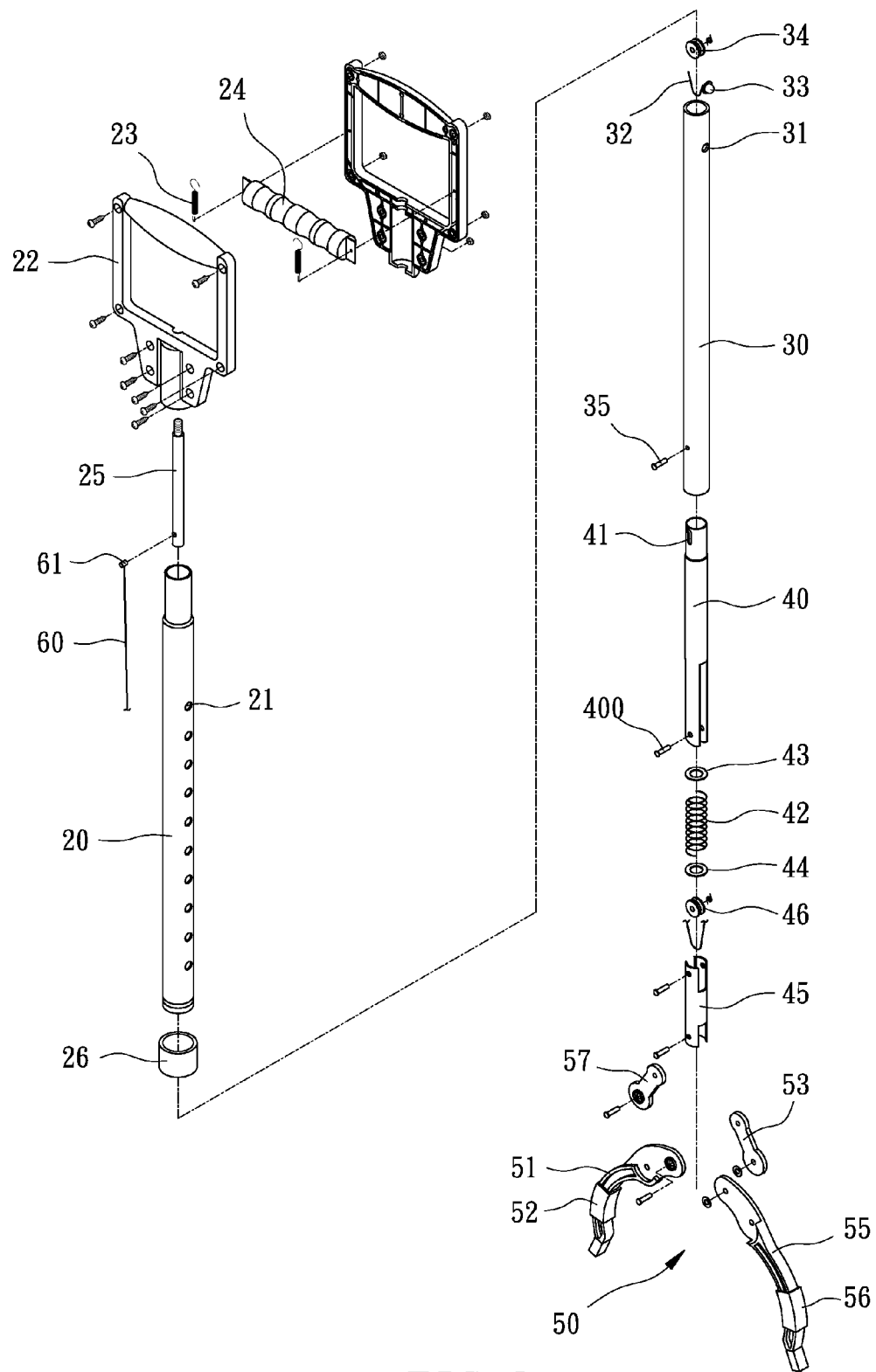
FIG. 2 is an exploded view of a telescopic clipping apparatus according to the preferred embodiment of the present invention.
Figure 3:
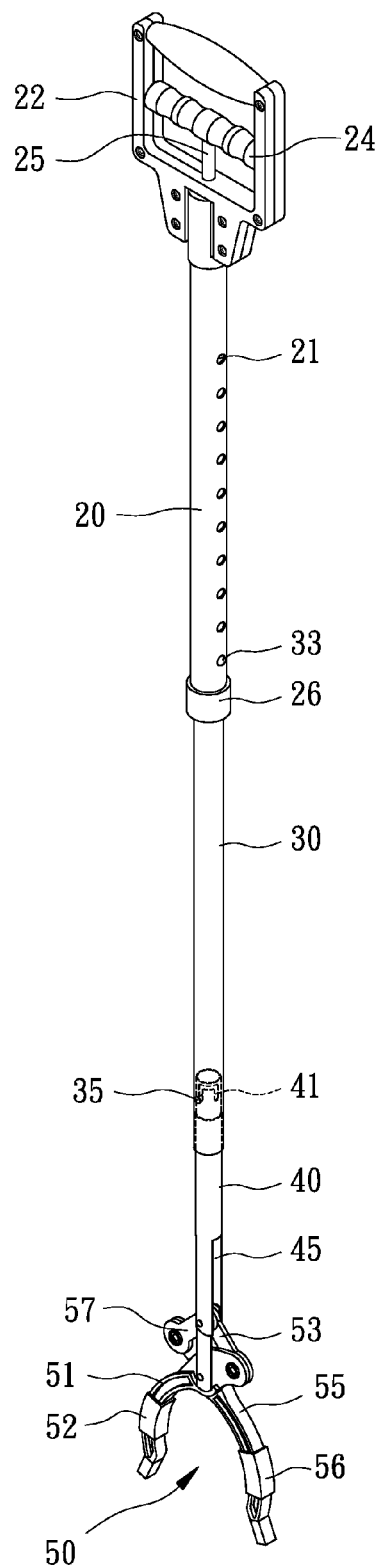
FIG. 3 is a perspective view of the telescopic clipping apparatus shown in FIG. 2.
Figure 4:
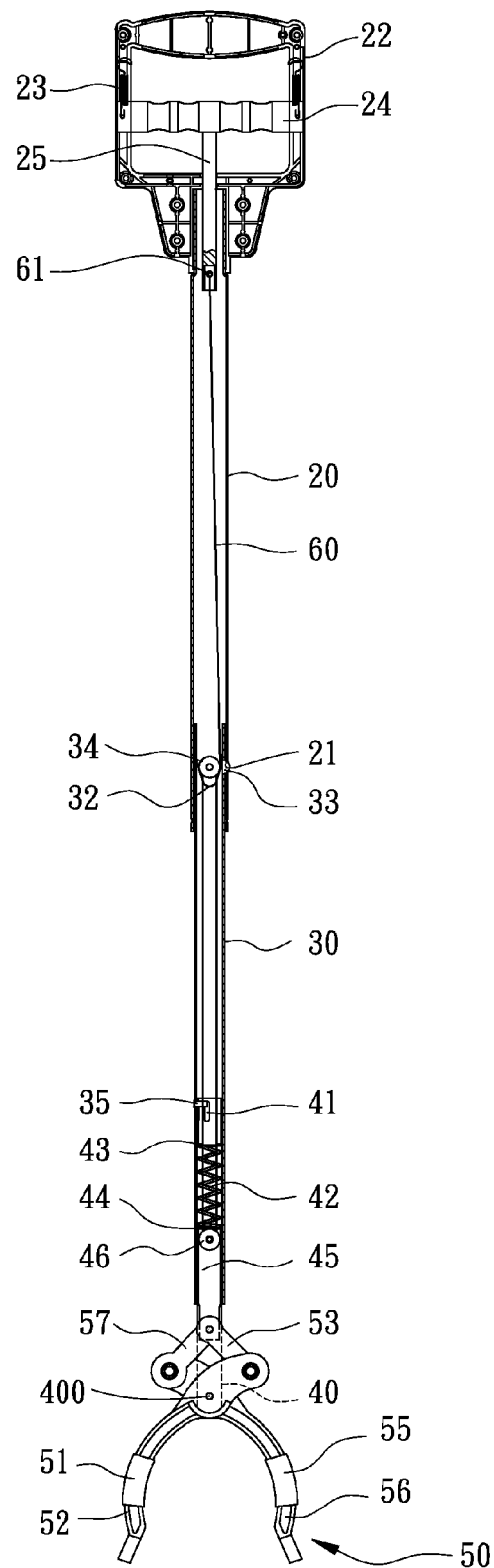
FIG. 4 is a cross-sectional view of the telescopic clipping apparatus shown in FIG. 3.

Referring to FIGS. 2 through 4, a telescopic clipping apparatus includes a telescopic unit, a handle 22, a lever 24, a clipping unit 50, a cable 60, a reel 34 and a pulley 46 according to the preferred embodiment of the present invention. The telescopic unit includes a first tube 20, a second tube 30 telescopically connected to the first tube 20 and a third tube 40 detachably connected to the second tube 30. The cable 60 includes a first end tied to the lever 24 and a second end tied to the reel 34. The cable 60 is wound around the pulley 46 that is connected to the clipping unit 50. The reel 34 is spring-loaded to ensure that the cable 60 be tight regardless of an effective length of the telescopic unit. Thus, a user can use the clipping unit 50 to clip a thing within a large range of distance from the user by pulling the lever 24.

The first tube 20 includes a series of apertures 21 defined therein. A ring 26 is provided around the first tube 20 and the second tube 30 after the second tube 30 is telescopically inserted in the first tube 20, thus reducing a gap between the first tube 20 and the second tube 30. The second tube 30 includes an aperture 31 defined therein. A spring-loaded detent 33 is located in the aperture 31. The spring-loaded detent 33 can be inserted in a selected one of the apertures 21 to keep the effective length of the telescopic unit in a desired value. An upper end of the third tube 40 is inserted in a lower end of the second tube 30. The clipping unit 50 is connected to two extensive portions from a lower end of the third tube 40.

The handle 22 is secured to the first tube 20. The lever 24 is movably connected to the handle 22. Two springs 23 are provided between the handle 22 and the lever 24 so that the springs 23 tend to move the lever 24 upwards as shown in the drawings. A rod 25 is secured to the lever 24.

The clipping unit 50 includes two jaws 51 and 55, two skid-proof sleeves 52 and 56 and two connecting elements 53 and 57. Like a pair of scissors, the jaws 51 and 55 are pivotally connected to the extensive portions from the third tube 40 with a pin 400. The skid-proof 52 is provided around the jaw 51. Similarly, the skid-proof 56 is provided around the jaw 55. The connecting element 53 is pivotally connected to the jaw 51. The connecting element 57 is also pivotally connected to the jaw 55.

A shuttle 45 is movably located in the third tube 40. The connecting elements 53 and 57 are pivotally connected to two extensive portions from a lower end of the shuttle 45. The pulley 46 is rotationally connected to two extensive portions from an upper end of the shuttle 45.

A spring 42 is located between two washers 43 and 44 before they are located between the shuttle 45 and a portion of the third tube 40. Thus, the spring 42 tends to move the shuttle downwards as shown in the drawings so that the jaws 55 tend to open.

The reel 34 is rotationally provided in the second tube 30. The first end of the cable 60 is tied to the rod 25. The second end of the cable 60 is tied to the reel 34.

Referring to FIG. 4, by pulling the lever 24, the user pulls the cable 60 through the rod 25. The cable 60 moves the pulley 46 upwards as well as the shuttle 45. The shuttle 45 closes the jaws 51 and 55 through the connecting elements 53 and 57.

Figure 5:
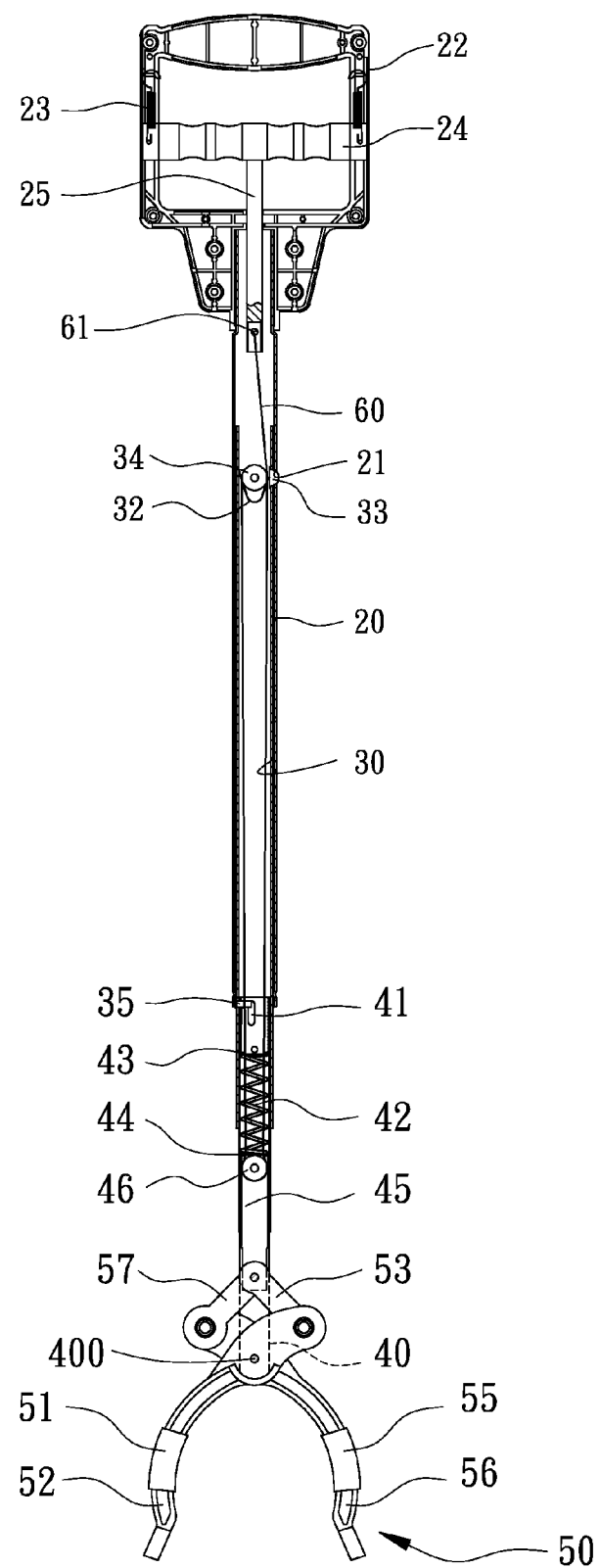
FIG. 5 is a cross-sectional view of the telescopic clipping apparatus in another position than shown in FIG. 4.
Figure 6:
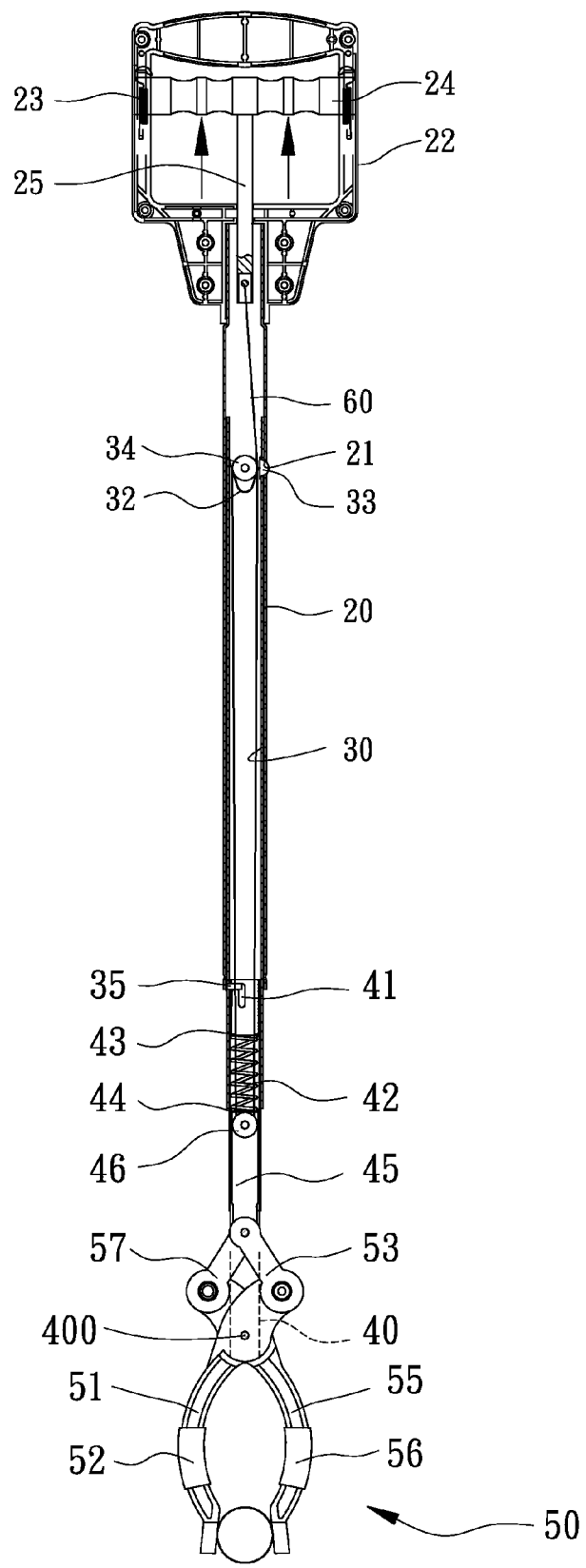
FIG. 6 is a cross-sectional view of the telescopic clipping apparatus in another position than shown in FIG. 5.

Referring to FIG. 5, the second tube 30 is inserted further into the first tube 20. The reel 34 reels in the cable 60, thus retaining the cable 60 tight. Referring to FIG. 6, by pulling the lever 24, the user can close the jaws 51 and 55 as discussed above.

Figure 7:
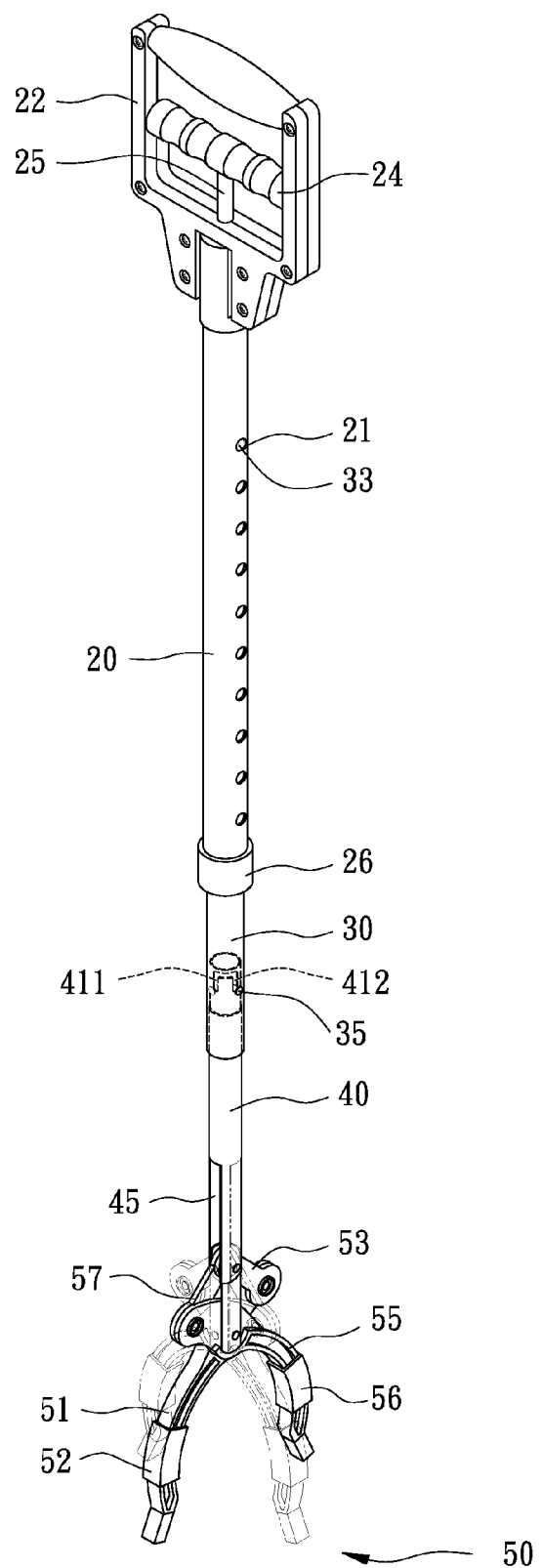
FIG. 7 is a perspective view of the telescopic clipping apparatus in another angular position than shown in FIG. 3.

Referring to FIGS. 2 and 7, a pin 35 is driven into the second tube 30. The third tube 40 includes two cutouts 411 and 412 at an end. The cutouts 411 and 412 are separated from each other by 90 degrees. When the third tube 40 is removed from the second tube 30, the third tube 40 can be pivoted between angular positions relative to the second tube 30, and so can the clipping unit 50. The third tube 40 can be inserted into the second tube 30 again, with the pin 35 inserted in a selected one of the cutouts 411 and 412. Thus, the third tube 40 is retained in a selected one of the angular positions relative to the second tube 30.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A telescopic clipping apparatus comprising:
   a handle;
   a lever movably connected to the handle;
   a telescopic unit connected to the handle;
   a clipping unit pivotally connected to the telescopic unit;
   a reel located in the telescopic unit;
   a pulley connected to the clipping unit; and
   a cable including a first end tied to the lever and a second end tied to the reel, wherein the cable is reeled onto the reel when the telescopic unit is shrunk and unreeled from the reel when the telescopic unit is extended so that the cable is always tight for pulling the pulley and therefore actuating the clipping unit regardless of an effective length of the telescopic unit.

2. The telescopic clipping apparatus according to claim 1, wherein the telescopic unit comprises a first tube secured to the handle and a second tube telescopically connected to the first tube.

3. The telescopic clipping apparatus according to claim 2, wherein the first tube comprises a series of apertures defined therein, the second tube comprises an aperture defined therein, and the telescopic unit comprises a detent for insertion in the aperture of the second tube and a selected one of the apertures of the first tube, thus retaining the first and second tubes in a desired one of positions relative to each other.

4. The telescopic clipping apparatus according to claim 3, wherein the detent is spring-loaded.

5. The telescopic clipping apparatus according to claim 2, wherein the telescopic unit comprises a ring provided around the first and second tubes to reduce a gap between the first and second tubes.

6. The telescopic clipping apparatus according to claim 2, wherein the telescopic unit comprises a third tube detachably connected to the second tube.

7. The telescopic clipping apparatus according to claim 6, wherein the telescopic unit comprising a pin driven into the second tube, and the third tube comprises two cutouts so that a selected one of the cutouts can receive the pin to retain the third tube in a selected one of two angular positions relative to the second tube.

8. The telescopic clipping apparatus according to claim 2, wherein telescopic unit comprises a third tube pivotally connected to the second tube.

9. The telescopic clipping apparatus according to claim 1, wherein the reel is spring-loaded.

10. The telescopic clipping apparatus according to claim 1 comprising a shuttle connected to the clipping unit on one hand and connected to the pulley on the other hand.

11. The telescopic clipping apparatus according to claim 10 comprising a spring compressed between a portion of the telescopic unit and a portion of the shuttle.

12. The telescopic clipping apparatus according to claim 1 comprising at least one spring between the handle and the lever.

13. The telescopic clipping apparatus according to claim 1, wherein the clipping unit comprises two jaws pivotally connected to the telescopic unit and two connecting elements each comprising an end connected to the cable and another end connected to a related one of the jaws.

* * * * *